US006990956B2

(12) United States Patent
Niimi

(10) Patent No.: US 6,990,956 B2
(45) Date of Patent: Jan. 31, 2006

(54) INTERNAL COMBUSTION ENGINE

(75) Inventor: Kuniaki Niimi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/895,913

(22) Filed: Jul. 22, 2004

(65) Prior Publication Data

US 2005/0028791 A1 Feb. 10, 2005

(30) Foreign Application Priority Data

Aug. 7, 2003 (JP) ............................ 2003-206480

(51) Int. Cl.
*F02B 7/00* (2006.01)

(52) U.S. Cl. ................ 123/406.47; 123/1 A; 123/299; 123/525; 123/575; 123/27 GE

(58) Field of Classification Search ................ 123/1 A, 123/406.47, 406.3, 27 GE, 299–300, 304–305, 123/525, 575

See application file for complete search history.

(56) References Cited

U.S. PATENT DOCUMENTS 5,195,497 A * 3/1993 Yoshida et al. ............. 123/696
5,267,163 A * 11/1993 Yoshida et al. ............. 701/104
5,311,852 A * 5/1994 Yoshida et al. ............. 123/674
5,934,255 A * 8/1999 Dalton et al. ............... 123/478
6,766,269 B2 * 7/2004 Lee ............................ 702/136

FOREIGN PATENT DOCUMENTS

GB 2 343 714 A 5/2000
JP 61-167167 * 7/1986
JP U 1-76567 5/1989
JP A 6-248988 9/1994
JP A 2000-154771 6/2000
JP A 2000-179368 6/2000
JP A 2000-329013 11/2000
JP A 2001-50070 2/2001
JP A 2001-193525 7/2001

* cited by examiner

*Primary Examiner*—Hai Huynh
(74) *Attorney, Agent, or Firm*—Oliff & Berridge, PLC

(57) ABSTRACT

An internal combustion engine, in which multiple kinds of fuels are fed to a cylinder from multiple fuel injectors each corresponding to each of multiple kinds of fuels at a target mixing ratio determined according to a running condition, includes an actual fuel mixing ratio calculator calculating an actual fuel mixing ratio of fuel fed to cylinder. The actual fuel mixing ratio calculator at first calculates actual fuel injection quantity of each fuel injection by adding or subtracting predetermined stuck-on-wall fuel to or from each quantity of fuel injected from each fuel injector, and then calculates an actual fuel mixing ratio of fuel fed to cylinder on the basis of the calculated actual fuel injection quantity of each fuel injector.

7 Claims, 7 Drawing Sheets

Fig.8
| | | | | |
|---|---|---|---|---|
| -100% | · | 0 | · | +100% |
| dSA1 | · | · | · | dSAn |
Fig.9
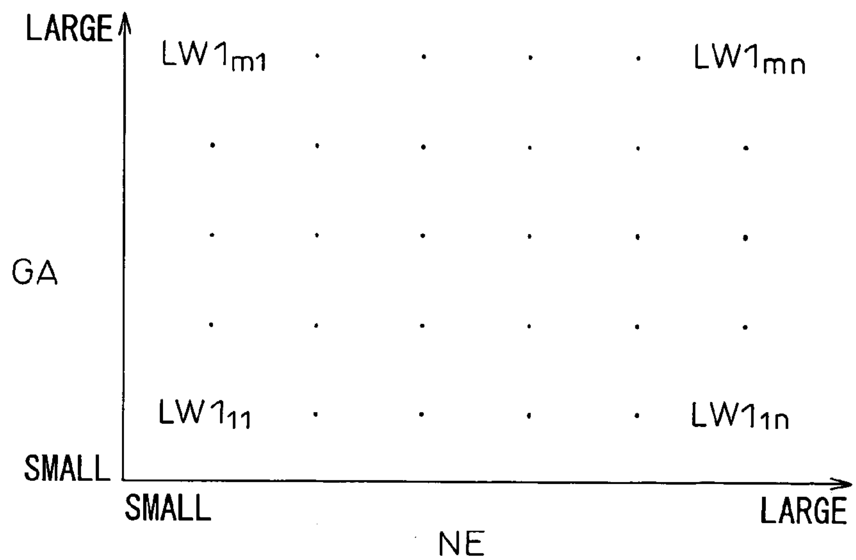
Fig. 10
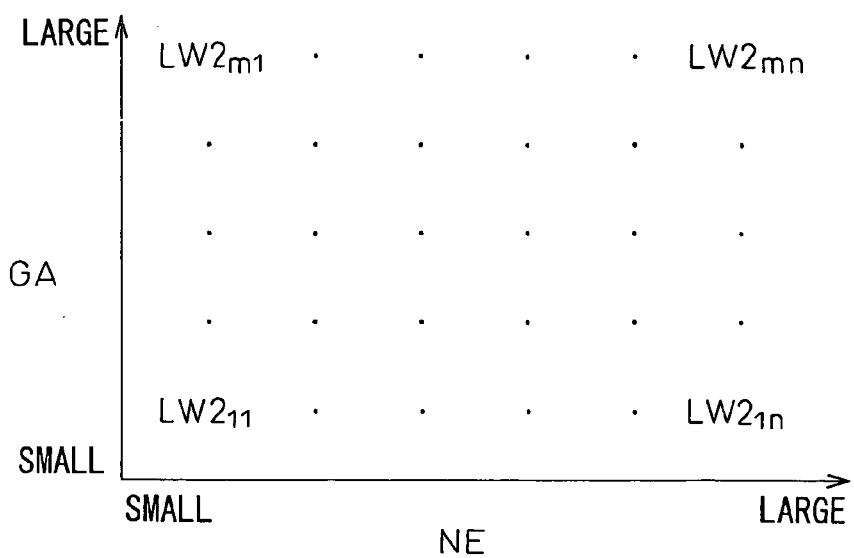

INTERNAL COMBUSTION ENGINE

BACKGROUND OF THE INVENTION

1. Field of the Invention

The present invention relates to an internal combustion engine in which a high RON fuel and a low RON fuel are mixed and fed to a combustion chamber, wherein high RON fuel means high octane number fuel, and low RON fuel means low octane number fuel.

2. Description of the Related Art

The low RON fuel has a good ignitability and a poor antiknock property, and the high RON fuel has a poor ignitability and a good antiknock property. Accordingly, an internal combustion engine in which the low RON fuel is stored in a low RON fuel tank and the high RON fuel is stored in a high RON fuel tank, and the low RON fuel and the high RON fuel are fed to a combustion chamber at a mixing ratio appropriate to a driving condition is well known and is disclosed in, for example, Japanese Unexamined Patent Publication (Kokai) No. 2001-50070.

In the internal combustion engine described in Japanese Unexamined Patent Publication (Kokai) No. 2001-50070, a target fuel mixing ratio is determined based on a running condition and fuel volumes in each tank. Multiple kinds of fuels are injected from a fuel injector so that the determined target fuel mixing ratio is achieved. However, the fuel infected from the fuel injector can stick to an intake port and, accordingly, a divergence, between the mixing ratio of the fuel actually fed to a combustion chamber and the target fuel mixing ratio, occurs. On the other hand, an ignition timing is set on the precondition that a plurality of fuel components are fed at the target fuel mixing ratio. Therefore, if a divergence, between the mixing ratio of the fuel actually fed to a combustion chamber and the target fuel mixing ratio, occurs a predetermined performance cannot be achieved.

SUMMARY OF THE INVENTION

The object of the present invention is to obtain a mixing ratio of the fuel actually fed to a combustion chamber, and to control other control parameters in accordance with the mixing ratio, in an internal combustion engine to which multiple kinds of fuels are fed.

According to a first aspect of the present invention, there is provided an internal combustion engine, in which multiple kinds of fuels are fed to a cylinder from multiple fuel injection means each corresponding to each of multiple kinds of fuels at a target mixing ratio determined according to a running condition, comprising an actual fuel mixing ratio calculation means calculating an actual fuel mixing ratio of fuel fed to cylinder, the actual fuel mixing ratio calculation means calculates actual fuel injection quantity of each fuel injection means by adding or subtracting predetermined stick-on-wall fuel to or from each quantity of fuel injected from each fuel injection means, and then calculates an actual fuel mixing ratio of fuel fed to cylinder on the basis of the calculated actual fuel injection quantity of each fuel injection means.

In the internal combustion engine having the above structure, the actual fuel mixing ratio of the fuel fed to a cylinder is accurately calculated by subtracting the stuck-on-wall fuel quantity from the quantity of fuel injected from each fuel injection means so that the target mixing ratio is achieved.

According to a second aspect of the present invention, there is provided an internal combustion engine, in which multiple kinds of fuels are fed to a cylinder from multiple fuel injection means each corresponding to each of multiple kinds of fuels at a target mixing ratio determined according to a running condition, comprising an actual fuel mixing ratio calculation means calculating an actual fuel mixing ratio of fuel fed to cylinder, and a fuel flow rate detecting means for detecting fuel flow rata of each of multiple kinds of fuels, the actual fuel mixing ratio calculation means calculates actual fuel mixing ratio of fuel fed to cylinder on the basis of fuel flow rate of each of fuels detected by the fuel flow rate detecting means.

In the internal combustion engine having the above structure, the actual fuel mixing ratio of the fuel fed to a cylinder is accurately calculated based on the flow rate of the fuel fed to each fuel injection means, which is detected by the fuel flow rate detecting means.

According to a third aspect of the present invention, there is provided an internal combustion engine, in the first or second aspect of the present invention, wherein the internal combustion engine is a spark-ignited internal combustion engine, and comprises ignition timing setting means for setting an ignition timing, said ignition timing setting means obtaining an execution ignition timing corresponding to the actual mixing ratio calculated by the actual fuel mixing ratio calculation means.

In the internal combustion engine having the above structure, the execution ignition timing corresponding to the actual fuel mixing ratio is set and, accordingly, the performance can be sufficiently achieved.

According to a fourth aspect of the present invention, there is provided an international combustion engine, in the third aspect of the present invention, wherein the ignition timing setting means comprises base ignition timing setting means for obtaining a base ignition timing corresponding to a running condition and ignition timing correction means for obtaining an execution ignition timing by correcting the base ignition timing obtained by the base ignition timing setting means, said ignition timing correction means comprising ignition timing modification means for modifying the execution ignition timing in accordance with the actual fuel mixing ratio calculated by the actual fuel mixing ratio calculation means.

According to a fifth aspect of the present invention, there is provided an internal combustion engine, in the first or second aspect of the present invention, wherein the internal combustion engine is a spark-ignited internal combustion engine, and comprises means for setting an ignition timing based on a driving condition just before an ignition; and ignition timing correction means for correcting an ignition timing set by the means for setting an ignition timing based on a driving condition, just before an ignition, in accordance with a running condition according to which the actual fuel mixing ratio is calculated, if the running condition is transient.

In the internal combustion engine having the above structure, the ignition timing is set based on a running condition just before an ignition, and if the running condition is transient, the set ignition timing is corrected in accordance with the running condition according to which the actual fuel mixing ratio is calculated.

The present invention may be more fully understood from the description of preferred embodiments of the invention set forth below, together with the accompanying drawings.

BRIEF DESCRIPTION OF THE DRAWINGS

FIG. 8 is a map of a corrective ignition advance modifier dSA;

FIG. 9 is a map of a stuck-on-wall fuel quantity LW1 of a low RON fuel; and FIG. 10 is a map of a stuck-on-wall fuel quantity LW2 of a high RON fuel.

DESCRIPTION OF THE PREFERRED EMBODIMENTS

Embodiments of the present invention will be described below with reference to the accompanying drawings.

Figure 1:
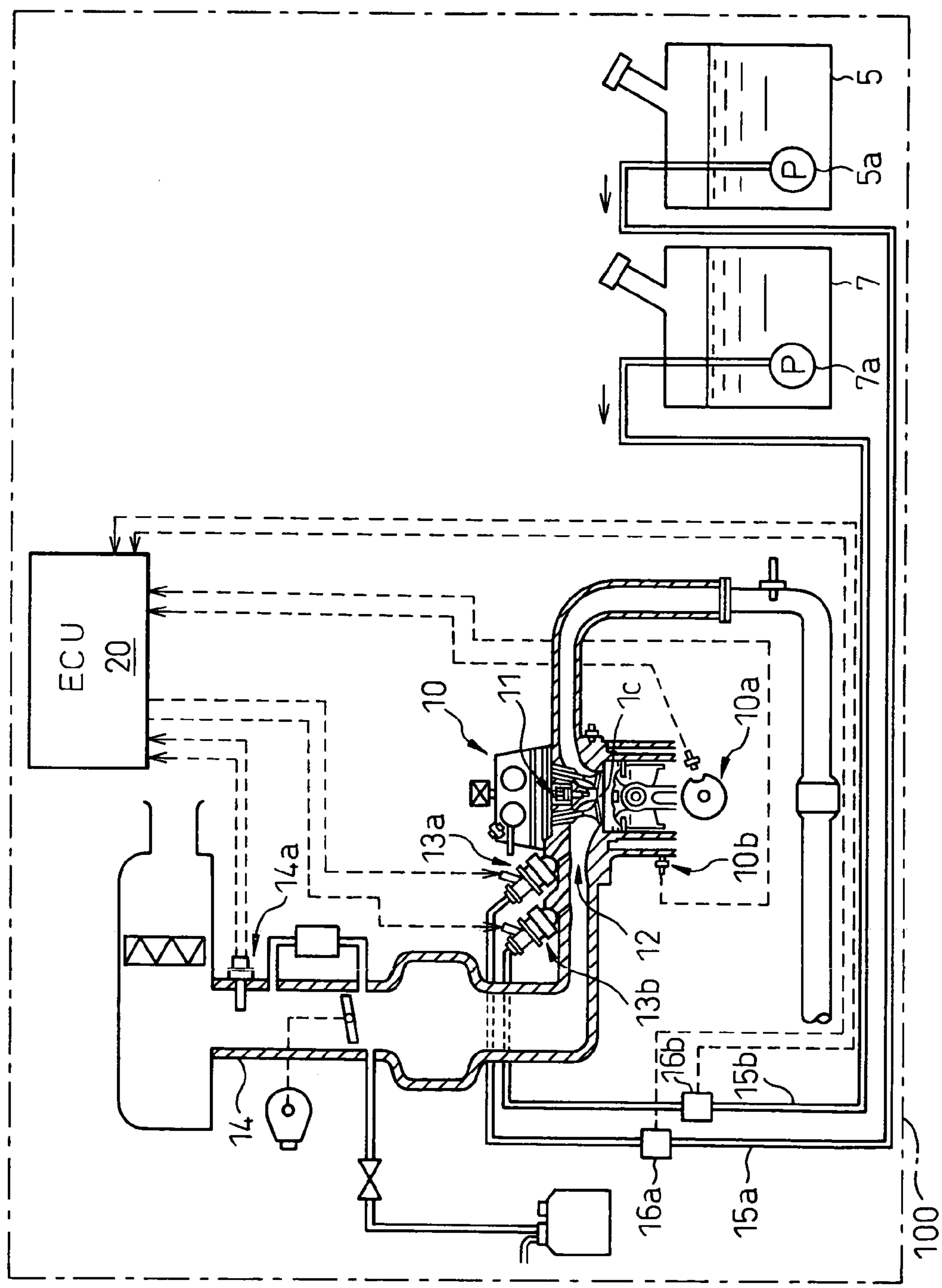
FIG. 1 is a view of a first embodiment of a hardware structure according to the present invention.

FIG. 1 is a schematic view of an embodiment of a hardware structure according to the present invention. In FIG. 1, a vehicle 100 is provided with a low RON fuel tank 5 to which a low RON fuel should be fed and a high RON fuel tank 7 to which a high RON fuel should be fed.

Fuel in the low RON fuel tank 5 and fuel in the high RON fuel tank 7 are fed to a first fuel injector 13*a* and a second fuel injector 13*b* that are attached to an intake port 12 of a spark-ignited internal combustion engine (hereinafter simply referred to as "engine") having a spark plug 11, by a low RON fuel pump 5*a* and a high RON fuel pump 7*a*, via a first fuel pipe 15*a* and a second fuel pipe 15*b*, respectively.

A first fuel flow meter 16*a* and a second fuel flow meter 16*b* for measuring the flow rate of the low RON fuel and the high RON fuel fed to the first fuel injector 13*a* and the second fuel injector 13*b* are provided in the first fuel pipe 15*a* and the second fuel pipe 15*b*, respectively. Detected values of the first fuel flow meter 16*a* and the second fuel flow meter 16*b* are sent to an electronic control unit (ECU) 20.

The first fuel injector 13*a* and the second fuel injector 13*b* inject the low RON fuel and the high RON fuel at a predetermined ratio appropriate to a driving condition, based on an instruction from the ECU 20. The injected fuels are mixed in the intake port 12 and a combustion chamber.

In the present embodiment, the intake port 12 is provided with two fuel injectors 13*a*, 13*b*. However, only one of the injectors may be an injector which can directly inject fuel into a cylinder, or an integral-type injector which can inject two fuel components to the intake port 12 may be provided.

A crank angle sensor 10*a* to detect an engine speed and a knock sensor 10*b* to measure the state of occurrence of a knock are attached to the engine 10. An airflow meter 14*a* to detect, as a load, an intake air flow rate is attached to an intake pipe 14. The detected values of the sensors and the meter are sent to the ECU 20.

Signals from other sensors are sent to the ECU 20, and signals are sent from the ECU 20 to control devices. However, signals that are not directly related to the present invention are omitted.

The control operation of a first embodiment of the present invention having the above-described hardware structure will be described below.

First, the outline of the control operation will be described. In the first embodiment, a difference between an actual fuel mixing ratio AFMIX and a target fuel mixing ratio TFMIX, i.e., a fuel mixing ratio difference DFMIX is obtained and then, an execution ignition timing is corrected based on the fuel mixing ratio difference DFMIX. The actual fuel mixing ratio AFMIX is obtained from a flow rate FL1 of the low RON fuel, detected by the first fuel flow meter 16*a* and a flow rate FL2 of the high RON fuel, detected by the second fuel flow meter 16*b*. The target fuel mixing ratio TFMIX is obtained from a map based on an intake air flow rate GA as a load of an engine speed NE.

With regard to the ignition timing, basically, the execution ignition timing SA is obtained by adding a corrective ignition advance KSA to advance the ignition timing to a knocking limit at which a knock is detected by a knock sensor 10*b*, to a base ignition timing BSA. The corrective ignition advance KSA is corrected based on the fuel mixing ratio difference DFMIX as described above.

Figure 3:
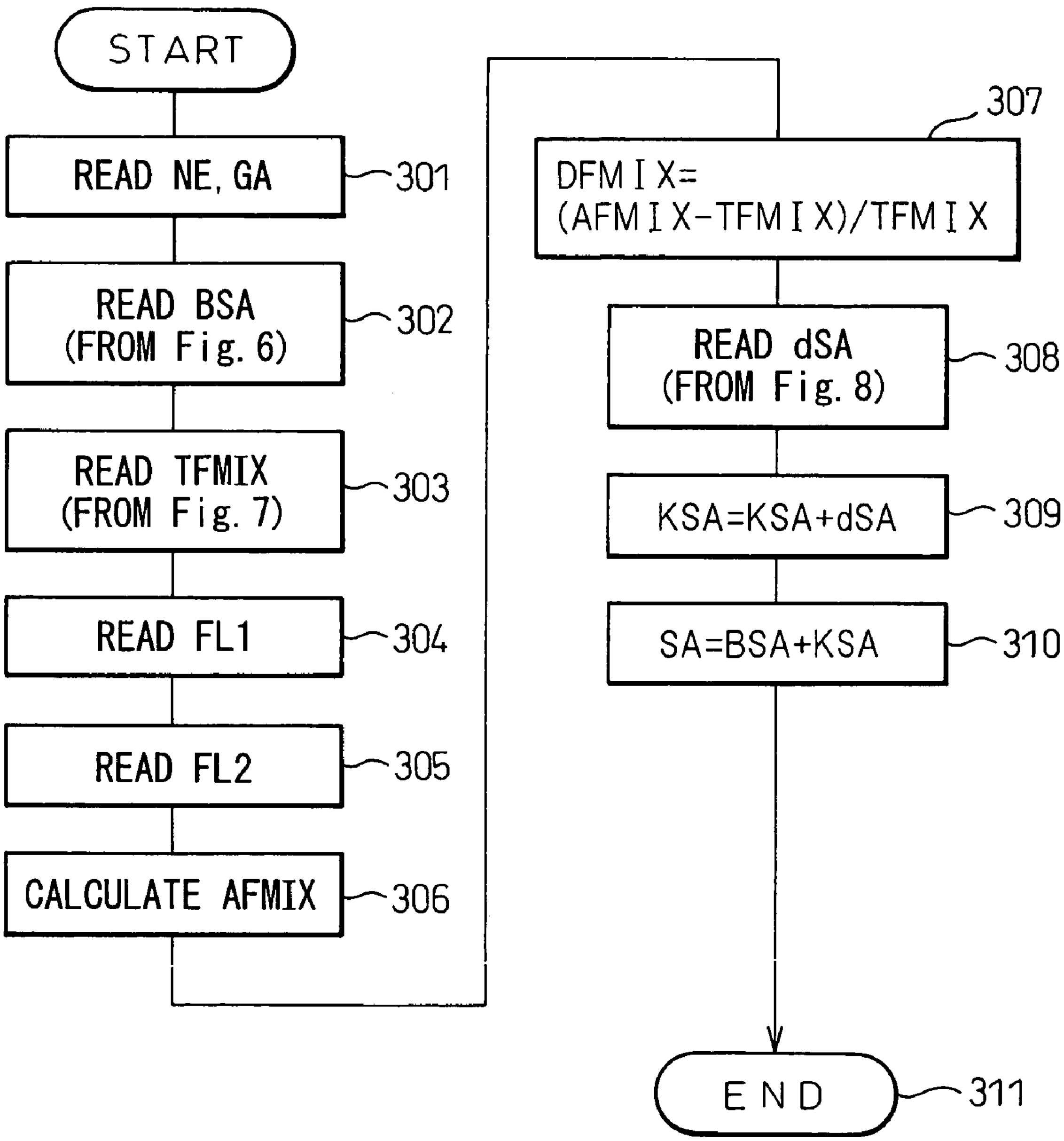
FIG. 3 is a flowchart of a first embodiment of a control operation according to the present invention.

FIG. 3 is a flowchart of the first embodiment in which the above-described control operation is carried out.

Figure 6:
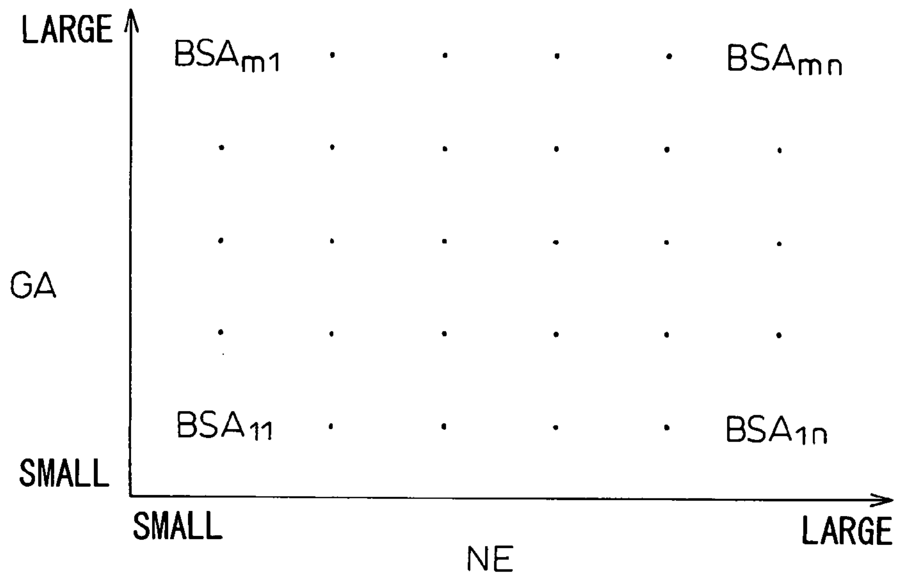
FIG. 6 is a map of a base ignition timing BSA.
Figure 7:
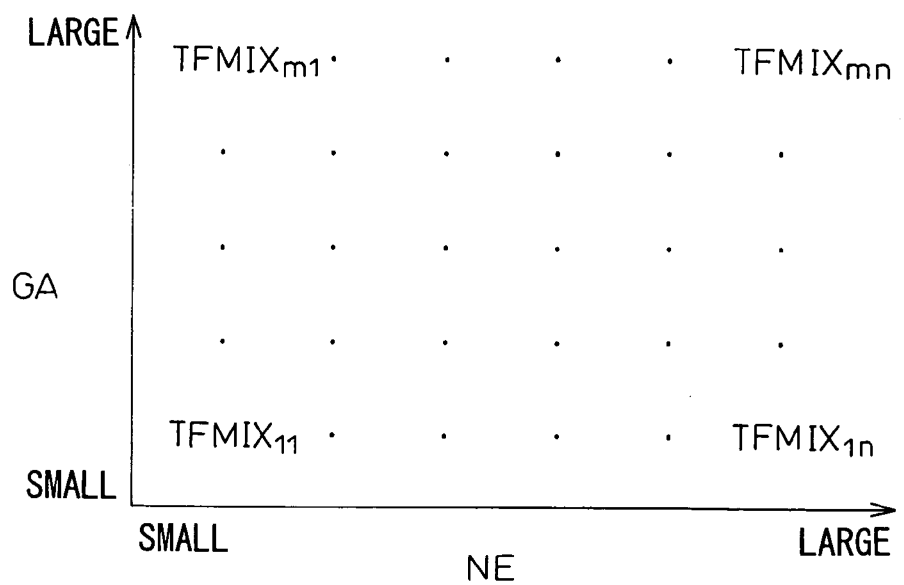
FIG. 7 is a map of a target fuel mixing ratio TFMIX.

First, at step 301, the engine speed NE and the intake air flow rate GA as a load are read. At step 302, the base ignition timing BSA corresponding to the engine speed NE and to the intake air flow rate GA read at step 301, is read from a map shown in FIG. 6, which has been previously stored. At step 303, the target fuel mixing ratio TFMIX is read from a map shown in FIG. 7, which has been previously stored. The target fuel mixing ratio TFMIX is stored as a ratio of the quantity of the low RON fuel or the high RON fuel to the sum of the quantities of the low RON fuel and the high RON fuel.

At step 304, the flow rate FL1 of the low RON fuel, which is detected by the first fuel flow meter 16*a*, is read. At step 305, the flow rate FL2 of the high RON fuel, which is detected by the second fuel flow meter 16*b*, is read. At step 306, the actual fuel mixing ratio AFMIX is calculated from the flow rate FL1 of the low RON fuel and the flow rate FL2 of the high RON fuel, which are read at steps 304, 305. The actual fuel mixing ratio AFMIX is calculated in a manner identical to the target fuel mixing ratio TFMIX.

At step 307, a fuel mixing ratio difference DFMIX between the actual fuel mixing ratio AFMIX and the target fuel mixing ratio TFMIX is obtained. The DFMIX is defined by $DFMIX=(AFMIX-TFMIX)/TFMIX$, and is a non-dimensional value represented by a ratio to the target fuel mixing ratio TFMIX.

At step 308, a corrective ignition advance modifier dSA corresponding to the fuel mixing ratio difference DFMIX is read from a map shown in FIG. 8, in which the relationship therebetween is previously stored. At step 309, the corrective ignition advance modifier dSA is added to the corrective ignition advance KSA. At step 310, the corrective ignition advance KSA obtained at step 309 by adding the corrective ignition advance modifier dSA is added to the base ignition timing BSA, to calculate the execution ignition timing SA and, then, the process ends. This routine is repeated at predetermined time intervals.

The first embodiment is constructed and operated as described above. Therefore, the actual fuel mixing ratio AFMIX is accurately obtained based on the flow rate FL1 of the low RON fuel, which is detected by the first fuel flow meter 16*a* and the flow rate FL2 of the high RON fuel, which is detected by the second fuel flow meter 16*b*, and the execution ignition timing SA is set in accordance with the obtained AFMIX. Consequently, the performance of the engine can be sufficiently achieved.

Figure 2:
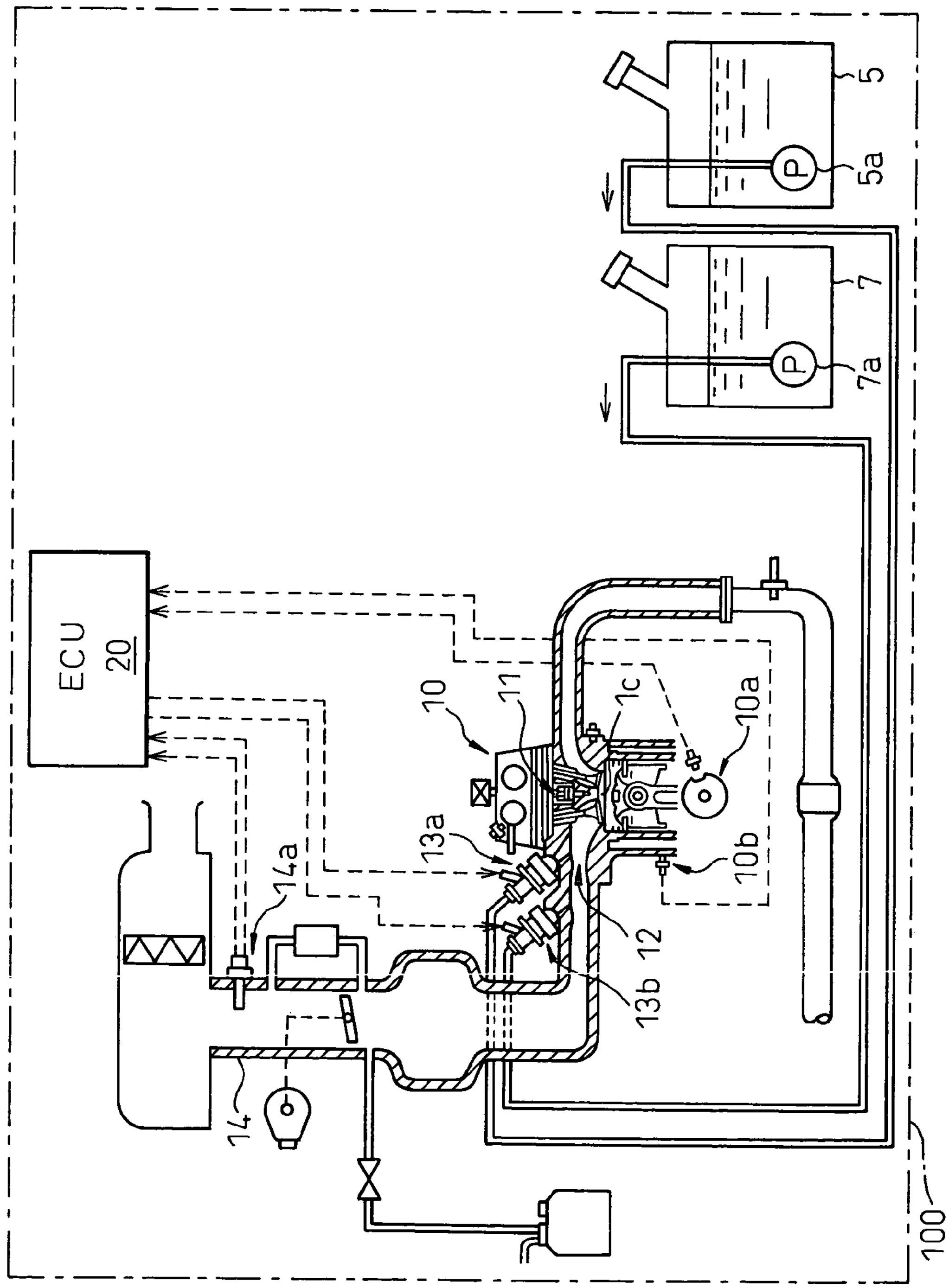
FIG. 2 is a view of a second embodiment of a hardware structure according to the present invention.

A second embodiment will be described below. FIG. 2 is a view of a second embodiment of a hardware structure according to the present invention. Except for the first fuel flow meter 16*a* and the second fuel flow meter 16*b* being removed, the second embodiment is identical to the first embodiment shown in FIG. 1.

In the second embodiment, the actual fuel mixing ratio AFMIX is obtained by subtracting the stuck-on-wall fuel quantities LW1 and LW2 (obtained from a map), for the intake pipe 12, from the injection fuel quantity TAU1 of the first fuel injector 13*a* and the injection fuel quantity TAU2 of the second fuel injector 13*b*, respectively. If a negative pressure is large, during coasting or the like, fuel stuck to an intake pipe wall surface is drawn in the cylinder. Thus, the stuck-on-wall fuel quantities LW1, LW2 are negative values and, accordingly, not subtraction but addition of LW1 and LW2 is actually executed.

Figure 4:
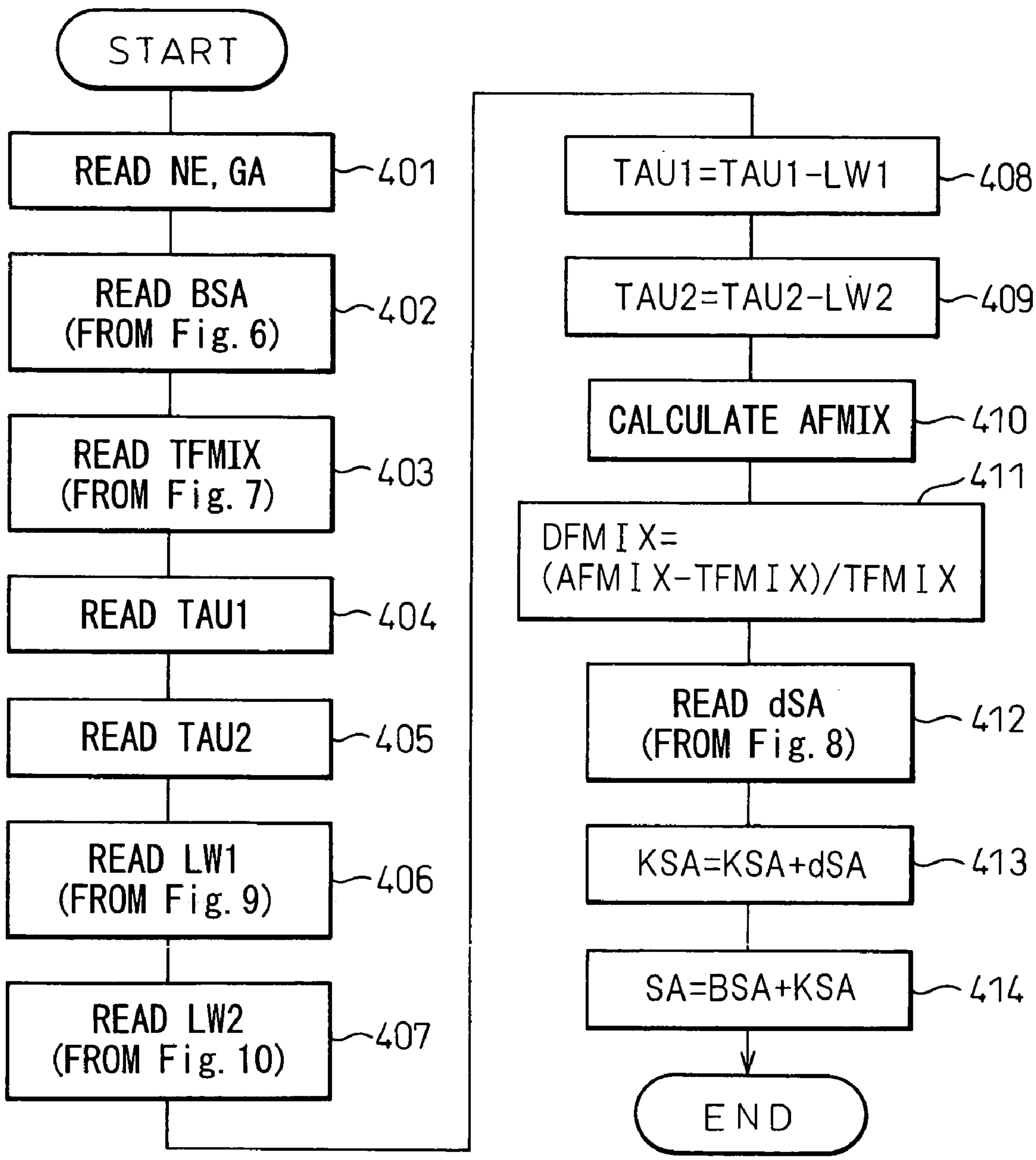
FIG. 4 is a flowchart of a second embodiment of a control operation according to the present invention.

FIG. 4 is a flowchart of the second embodiment in which the above-described control operation is carried out. Steps 401 to 403 are identical to the steps 301 to 303 in the flowchart of the first embodiment. At steps 404, 405, the injection fuel quantity TAU1 of the first fuel injector 13*a* and the injection fuel quantity TAU2 of the second fuel injector 13*b* are read. An instruction value of a valve opening period is read from the ECU 20 into each fuel injector.

At steps 406, 407, the stuck-on-wall fuel quantity LW1 of the low RON fuel and the stuck-on-wall fuel quantity LW2 of the high RON fuel are read from maps shown in FIGS. 9, 10, which has been previously stored.

At step 408, the actual injection fuel quantity is updated by subtracting the stuck-on-wall fuel quantity LW1 from the injection fuel quantity TAU1 of the first fuel injector 13*a*. Likewise, at step 409, the actual injection fuel quantity is updated by subtracting the stuck-on-wall fuel quantity LW2 from the injection fuel quantity TAU2 of the first fuel injector 13*a*.

At step 410, the actual fuel mixing ratio AFMIX is obtained in a manner similar to the step 306 of the first embodiment. Steps 411 to 414 are identical to the steps 307 to 310 of the first embodiment.

The second embodiment is constructed and operated as described above. The actual fuel mixing ratio AFMIX is accurately obtained based on the injection fuel quantities TAU1, TAU2 that have been updated into the actual injection fuel quantities and, then, the execution ignition timing SA is set in accordance with the obtained AFMIX. Thus, the performance of the engine is sufficiently achieved.

A third embodiment will be described. In the third embodiment, when a running condition is transient, a divergence between the mixing ratio of fuel that is actually fed to a combustion chamber 1*c* and the mixing ratio when an ignition timing is set, occurs. This prevents the occurrence of a knock.

Figure 5:
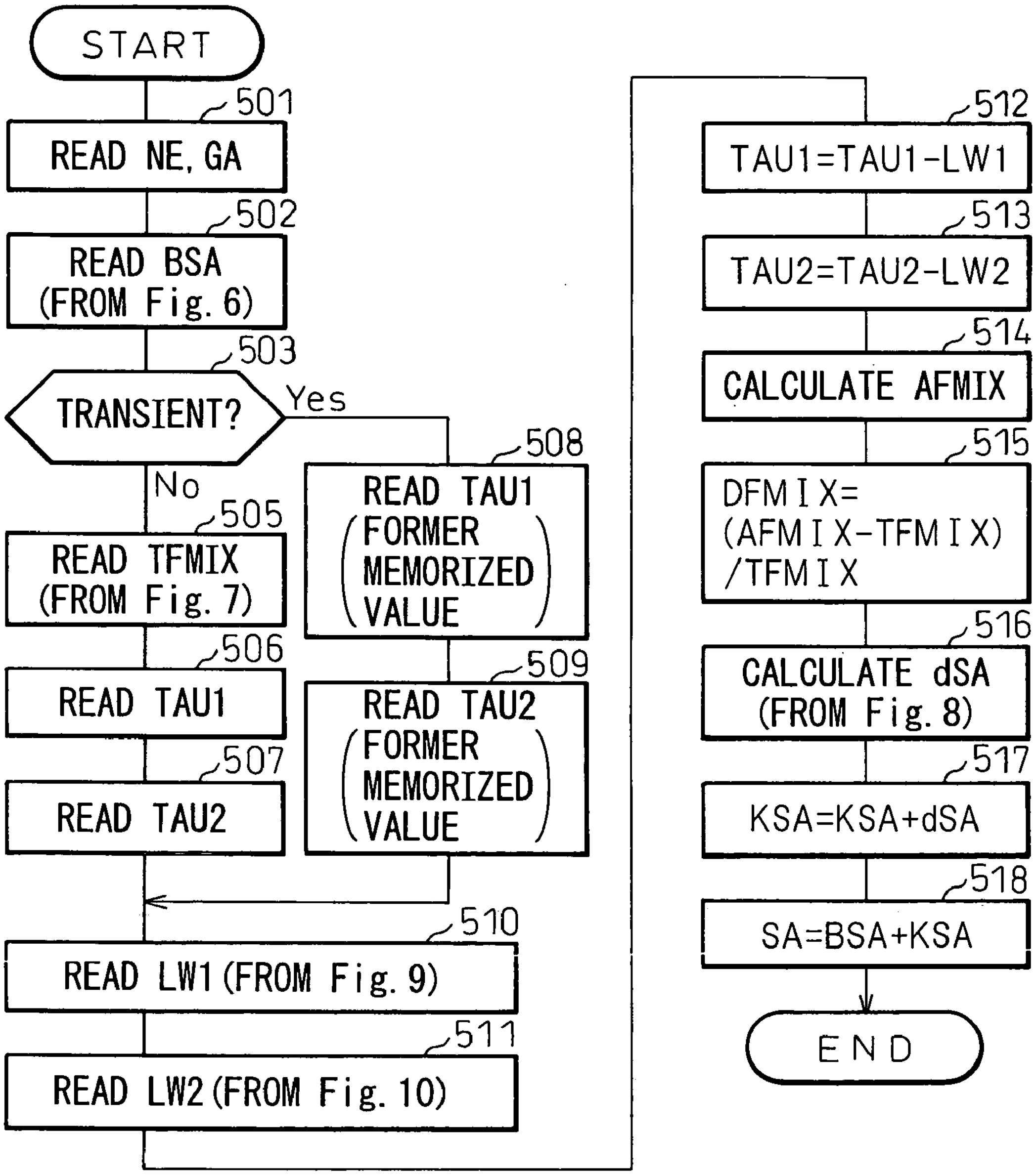
FIG. 5 is a flowchart of a third embodiment of a control operation according to the present invention.

FIG. 5 is a flowchart of the third embodiment. Steps 501, 502 are identical to the steps 401, 402 of the second embodiment. At step 503, whether or not a running condition is transient is judged.

If the judgment at step 503 is negative, i.e., the running condition is not transient, after steps 505 to 507 identical to the steps 403 to 405 of the second embodiment are carried out, steps 510 to 518 identical to the steps 406 to 414 of the second embodiment.

On the other hand, if the judgment at step 503 is affirmative, i.e., the running condition is transient, after TAU1 and TAU2, that have been previously memorized, are read at steps 508, 509, respectively, steps 510 to 518 identical to the steps 406 to 414 of the second embodiment are carried out. Therefore, if the running condition is transient, the ignition timing is corrected based on the running condition according to which the mixing ratio of fuel actually fed to the combustion chamber 1*c* and, thus, no knock occurs.

What is claimed is:

1. An internal combustion engine, in which multiple kinds of fuels are fed to a cylinder from multiple fuel injection means each corresponding to each of multiple kinds of fuels at a target mixing ratio determined according to a running condition, comprising an actual fuel mixing ratio calculation means calculating an actual fuel mixing ratio of fuel fed to cylinder, said actual fuel mixing ratio calculation means calculates actual fuel injection quantity of each fuel injection means by adding or subtracting predetermined stuck-on-wall fuel to or from each quantity of fuel injected from each fuel injection means, and then calculates an actual fuel mixing ratio of fuel fed to cylinder on the basis of the calculated actual fuel injection quantity of each fuel injection means.

2. An internal combustion engine, according to claim 1, wherein the internal combustion engine is a spark-ignited internal combustion engine, and comprises timing setting means for setting an ignition timing, said ignition timing setting means obtaining an execution ignition timing corresponding to the actual mixing ratio calculated by the actual fuel mixing ratio calculation means.

3. An international combustion engine, according to claim 2, wherein the ignition timing setting means comprises base ignition timing setting means for obtaining a base ignition timing corresponding to a running condition and ignition timing correction means for obtaining an execution ignition timing by correcting the base ignition timing obtained by the base ignition timing setting means, said ignition timing correction means comprising ignition timing modification means for modifying the execution ignition timing in accordance with the actual fuel mixing ratio calculated by the actual fuel mixing ratio calculation means.

4. An internal combustion engine, according to claim 1, wherein the internal combustion engine is a spark-ignited internal combustion engine, and comprises means for setting an ignition timing based on a driving condition just before an ignition; and ignition timing correction means for correcting an ignition timing set by the means for setting an ignition timing based on a driving condition, just before an ignition, in accordance with a running condition according to which the actual fuel mixing ratio is calculated, if the running condition is transient.

5. An internal combustion engine, in which multiple kinds of fuels are fed to a cylinder from multiple fuel injection means each corresponding to each of multiple kinds of fuels at a target mixing ratio determined according to a running condition, comprising an actual fuel mixing ratio calculation means calculating an actual fuel mixing ratio of fuel fed to cylinder, and a fuel flow rate detecting means for detecting fuel flow rata of each of multiple kinds of fuels, said actual fuel mixing ratio calculation means calculates actual fuel mixing ratio of fuel fed to cylinder on the basis of fuel flow rate of each of fuels detected by said fuel flow rate detecting means.

6. An internal combustion engine, according to claim 5, wherein the internal combustion engine is a spark-ignited internal combustion engine, and comprises timing setting means for setting an ignition timing, said ignition timing setting means obtaining an execution ignition timing corresponding to the actual mixing ratio calculated by the actual fuel mixing ratio calculation means.

7. An internal combustion engine, according to claim 5, wherein the internal combustion engine is a spark-ignited internal combustion engine, and comprises means for setting an ignition timing based on a driving condition just before an ignition; and ignition timing correction means for correcting an ignition timing set by the means for setting an ignition timing based on a driving condition, just before an ignition, in accordance with a running condition according to which the actual fuel mixing ratio is calculated, if the running condition is transient.

* * * * *